Figure 1:
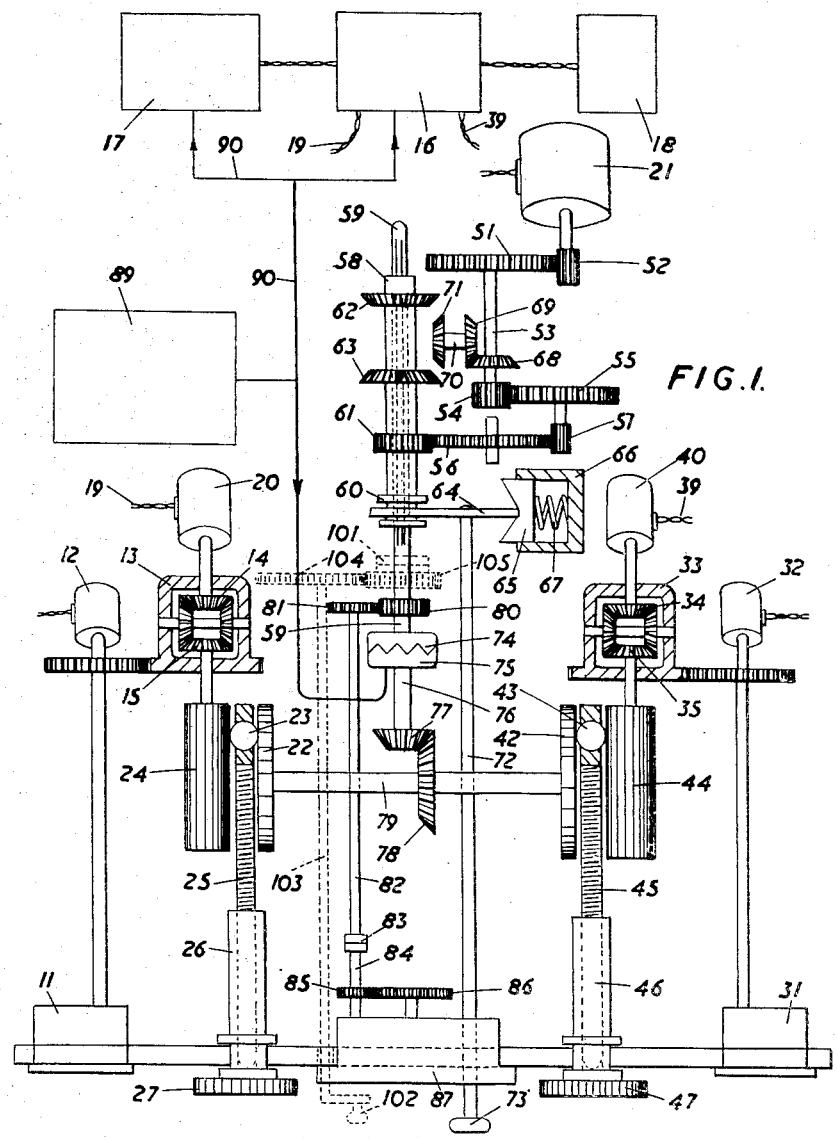

Oct. 16, 1951   H. L. REILLY ET AL   2,571,484
COMPUTING OR INDICATING APPARATUS
Filed Feb. 26, 1948

INVENTORS
HUGH L. REILLY, FRANK H. SCRIMSHAW & PETER C. LAMBERT
By Young, Emery & Thompson ATTYS.

Patented Oct. 16, 1951

2,571,484

UNITED STATES PATENT OFFICE 2,571,484

COMPUTING OR INDICATING APPARATUS

Hugh Lambert Reilly, Frank Herbert Scrimshaw, and Peter Charles Lambert, Farnborough, England, assignors, by mesne assignments, to Kelvin & Hughes Limited, Glasgow, Scotland, a British company Application February 26, 1948, Serial No. 11,024
In Great Britain December 10, 1946

Section 1, Public Law 690, August 8, 1946
Patent expires December 10, 1966

4 Claims. (Cl. 235—61)

This invention relates to computing or indicating apparatus, such as ground position indicating apparatus for use on aircraft of the kind in which a constant speed movement, representing, for example, a cardinal component of the wind "set in" to the apparatus, is combined thereby with a further applied movement according, for example, to a cardinal component of travel relative to the air, to produce indicating or recording movement, corresponding, for example, to a cardinal component of travel relative to the ground.

Successful use of such apparatus is dependent upon the accuracy with which that part of the apparatus which produces the constant speed movement is adjusted or set, and the present invention has for an object to provide means whereby correct indication or recording by the apparatus may be established readily in the event of previous erroneous indicating or recording movement having taken place due to incorrect setting or adjustment.

To this end and in accordance with the invention, is an apparatus of the kind referred to, an indicator device marked in units of time is so coupled operatively to a constant speed input section of a continuously variable gear, the ratio of which is adjusted to set in the constant speed movement, as normally, when the apparatus is in use, to indicate the time and means are provided whereby said input gear section and the time indicator device may be driven simultaneously and in step at relatively high speed in either direction at will.

In use; supposing it is found that the apparatus has been in operation for, say, 1½ hours with the variable gear ratio incorrectly adjusted, and the correct setting is known, this is remedied by first effecting reverse high speed drive with the variable gear still at the same incorrect setting until the time indicator reading has been reduced by 1½ hours, then adjusting the variable gear ratio to the correct setting and effecting forward high speed drive until the time indicator reading arrives at its previous value plus the time taken for the correcting operation when the normal drive to both time indicator and input gear section is restored.

Preferably, provision is made for restoring automatically at the termination of high speed forward drive, the normal time drive to the time indicator and to the constant speed input section of the variable gear.

Figure 2:
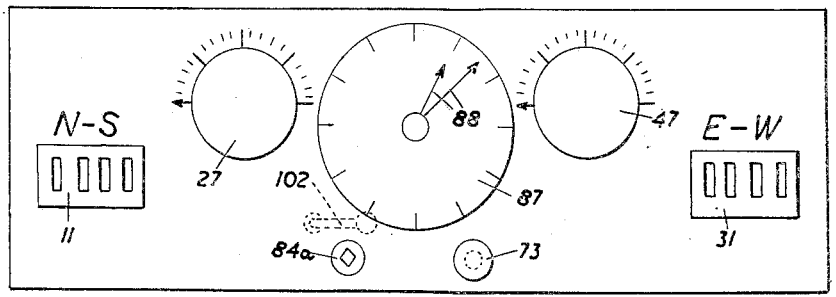

The accompanying drawings show diagrammatically one form of the invention as applied to a ground position indicating apparatus for use on aircraft, Figure 1 being a plan view and Figure 2 being an elevation showing the front of the panel.

The apparatus has a counter indicated at 11 showing north-south ground miles and an electric transmitter 12 of known type for transmitting motion according to north-south ground miles to an associated apparatus (not shown) for moving a stylus or equivalent over a map in accordance with ground position, such associated apparatus, however, forming no part of the present invention as such. This counter 11 and transmitter 12 are driven from the planet carrier or cage 13 of a differential gear of which the two side wheels 14 and 15 are driven in accordance with north-south air miles and the north-south component of the wind, respectively. The drive in accordance with north-south air miles is obtained from an air position indicator indicated generally at 16 of known type which is associated with an air log or air mileage unit indicated generally at 17 of known type and a repeating compass indicated generally at 18 of known type to resolve a drive from the unit 17 according to air miles into two drives according to air miles north-south and according to air miles east-west, respectively. The north-south air miles drive is transmitted by electrical means of known type including leads indicated at 19 and a repeater motor 20 to the side wheel 14. The drive according to the north-south wind component is obtained from a constant speed motor indicated at 21 of known type via a variable friction type gear comprising an input disc 22, a coupling ball 23 and an output member in the form of an elongated cylinder 24. The ball 23 is in frictional driving co-operation with the disc 22 and roller 24 and is accommodated in a hole in a rod 25 in screw threaded engagement with an axially held sleeve 26 which is rotatable by means of a knob 27, fast thereon, to cause the ball 23 to traverse the disc 22 whereby the ratio of the gear 22, 23, 24 may be varied continuously through zero. The output member 24 is coupled by a shaft to the side wheel 15 to drive it in either direction or to hold it against rotation according to the adjustment of the north-south wind gear 22, 23, 24.

The apparatus has a similar arrangement of counter 31, transmitter 32, differential gear 33, 34, 35, continuously variable friction gear 42, 43, 44, and repeater motor 40 connected by leads 39 with the air position indicator, for the east-west wind component and east-west air miles.

The constant speed motor 21 is connected through step down gearing indicated as toothed wheels 51, 52 with an intermediate shaft 53 and through further step down gearing of higher ratio indicated as two pairs 54, 55 and 56, 57 of toothed wheels with a sleeve 58 which is splined, and therefore slidable axially but unrotatable on, a drive shaft 59. This sleeve 58 has fast thereon a grooved collar 60, a pinion 61 and two oppositely directed bevel wheels 62, 63 and is normally held in the position shown by a member 64, one forked end of which engages in the collar 60 and the other end of which co-operates with a V-shaped groove in one face of a plunger 65 slidable in a cup-like guide 66 and pressed into engagement with the member 64 by a spring 67. The intermediate shaft 53 is connected by bevel wheels 68, 69, and a short shaft 70 to drive a bevel wheel 71 adapted to be engaged by either of the bevel wheels 62 and 63 on the sleeve 58 and a rod 72 extends from the member 64 to a knob or handle 73.

When the knob 73 and sleeve 58 are in their normal positions as shown operation of the motor 21 will transmit a normal, low speed drive, via gears 51, 52 and 54, 55, 57, 56 and 61 to the drive shaft 59. When the knob 73 is pushed and held in, gear 61 will be disengaged from gear 56 and bevel 63 will be engaged with bevel 71, and so the slow speed drive will be interrupted and high speed drive in the reverse direction will take place via gears 51, 52 and bevels 68, 69, 71, 63 until the knob 73 is released, when normal slow speed drive is automatically restored by the action of the spring plunger 65. Similarly, high speed drive in the same or forward direction via bevels 71 and 62 may be effected by pulling and holding out the knob 73.

The drive shaft 59 has fast thereon the input member 74 of a magnetic clutch 74, 75, the output member 75 of which is connected by a shaft 76, bevels 77, 78 and a cross-shaft 79 to the input members or discs 22 and 42 of the north-south and east-west wind setting gears 22, 23, 24 and 42, 43, 44 respectively. The drive shaft 59 has also fast thereon a toothed wheel 80 meshing with a wheel 81 connected by a shaft 82, a clutch 83 which is capable of slipping when overloaded, a shaft 84, and toothed wheels 85, 86 to drive an indicator device showing units of time and which comprises a clock "face" and "hands" indicated at 87 and 88, respectively. The shaft 84 is continued beyond the wheel 85 to the front of the instrument panel where it terminates in a squared end 84a to take a key for setting the hands 88. The clutch 83 is intended to slip when the hands are being set but not at other times.

The magnetic clutch 74, 75 is intended to be engaged only when the associated air position indicator 16 is operative so that wind component drives cannot take place unless drives according to air mileage components are also being applied via the repeater motors 20 and 40. For this purpose a main control panel, indicated generally at 89 is connected by leads indicated at 90 with the clutch 74, 75 as well as with the air log 17 and air position indicator 16. Thus the clock 87, 88 may be driven alone to show the time or for adjustment to the correct time of day or to the time elapsed since the commencement of a run or trip (not necessarily from take off).

In use the clock 87, 88 will be adjusted in this way, the knobs 27 and 47 adjusted in accordance with the north-south and east-west components of the wind and then the air position indicator 16 switched on and the magnetic clutch 74, 75 simultaneously engaged, whereupon the counters 11 and 31 will be driven continuously to show ground position north-south and east-west and the transmitters 12 and 32 will be operated to transmit motion according to north-south and east-west ground miles, respectively, to apparatus (not shown) for plotting or otherwise indicating the ground position on a map or chart.

Suppose that it is found that the apparatus has been in use for, say, 1½ hours with the wind components, i. e. the ratio's of the variable gears 22, 23, 24 and 42, 43, 44, incorrectly set, and that more accurate values for these components are known. In order to correct for this, the knob 73 is pushed and held in and reverse drive at high speed is thus effected until the clock reading has been reduced by 1½ hours, then knob 73 is released and the knobs 27 and 47 are adjusted to the more accurate values, and when this has been done the knob 73 is pulled and held out and forward high speed drive is thus effected until the clock hands 88 have been moved forward again 1½ hours plus the time taken for the correcting operation, when the knob 73 is immediately released, thereby restoring the normal slow speed drive to impart to the side bevels 15 and 35 motion in accordance with the more accurate wind components now set into the gears 22, 23, 24 and 42, 43, 44, respectively. It will be noted that normal drive will be effective while the knobs 27 and 47 are being re-set to the more accurate values (after the high speed reverse drive has terminated and before the high speed forward drive has commenced) the error due to this is so small, however, as to be in general negligible. Even this error may be removed if desired by the provision of means (not shown, associated for example with the rods 72) whereby the clutch 83, may be disengaged while the knobs 27 and 47 are being reset.

In a modification the constant speed motor 21 has one normal driving connection only, such as 52, 51, 53, 54, 55, 57, 56, 61, to the drive shaft 59, and the latter is divided and its adjacent ends operatively connected by a clutch as indicated by broken lines at 101, which is capable of slip when overloaded. The shaft 59 is connected to drive the input member 74 of the magnetic clutch 74, 75 and the time indicator device 87, 88 via the clutch 101. Independent driving means indicated by broken lines as a crank handle 102, shaft 103 and toothed wheels 104 and 105 are provided for effecting high speed reverse and forward drive of the clutch 74, 75 and time indicator device 77, 78.

It will be understood that the clutch 83 will slip when the clock hands 88 are being adjusted by means of a key engaging the squared end of the shaft 84, and that in the modification just described the clutch 101 will slip while high speed reverse or forward drive is being effected by the independent driving means.

It will be seen that the time indicator device may normally indicate true time, i. e. the time of day, e. g., Greenwich mean time, or, if preferred, the time from the commencement of a given operation, e. g., of a given run or trip of an aircraft not necessarily from the ground. In the former case the high speed forward drive, i. e., the correcting operation as a whole, will be terminated simply when the time indicator shows the time once more, but in the latter case it will be necessary to note the time, true or otherwise, at which the correcting operation was commenced and to terminate the correcting operation when the time indicator shows the time (including the time taken of the correcting operation) which has elapsed from the commencement of the given run, trip or other operation which may easily be done by setting a watch or clock to agree with the time indicator device prior to commencing the correcting operation.

It will be observed that in an apparatus according to the invention errors caused by inaccuracy of the constant speed drive will be indicated by correspondingly erroneous indications of the time indicator employed and may be removed very readily by operating the high speed drive to correct the time indicator indication so long as the drive to the variable gear input section is not interrupted, for example, by disengagement of the magnetic clutch in the case of the ground position indicator apparatus described.

We claim:

1. A computing apparatus comprising a value indicator for indicating a computed value, a gearing device having first and second input members and an output member, connecting means connecting said output member to said indicator, a variable ratio gear having an input element, an output element operatively connected to said second input member and a ratio adjusting member, a constant speed drive device, drive transmitting means for transmitting drive from said device to the first said input element, a variable drive device, means for connecting said variable drive device to said first input member, an adjusting element, means connecting said element to the said ratio adjusting member for adjusting the gear ratio of said variable ratio gear, a time indicator, means connecting said time indicator to said drive transmitting means, a correction element, and means controlled by said correction element for applying motion forward and reverse at will to said drive transmitting means thereby simultaneously operating the value indicator and time indicator so as to correct the value indicator for a period indicated by the rapid adjustment of the time indicator.

2. An apparatus as claimed in claim 1 having time indicator adjustment means connected to said drive transmitting means for adjusting the time indicator, said time indicator adjustment means including a slipping clutch which slips when said time indicator adjustment means is actuated.

3. An apparatus as claimed in claim 1 having a drive element driven by said constant speed drive device and wherein said motion transmitting means includes a forward member and a reverse drive member, a movable element for engaging either of said members with said drive element, and means for automatically moving said movable element to a neutral position in which said members are both disengaged from said drive element.

4. An apparatus as claimed in claim 1 wherein said drive transmitting means includes an electrically operated clutch, and having an air mileage unit, an air position indicator unit, said units being interconnected and also coupled to said clutch to engage the clutch only when said units are in operation, a repeating compass coupled between said air position indicator and said variable drive device, said value indicator showing ground miles in one direction, and a second value indicator being provided together with a second such gearing device, second connecting means, second such variable ratio gear, second adjusting element, and means connecting said second adjusting element to the ratio adjusting member of said second variable ratio gear, the said drive transmitting means being also connected to the first input member of the second gearing device.

HUGH LAMBERT REILLY.
FRANK HERBERT SCRIMSHAW.
PETER CHARLES LAMBERT.

REFERENCES CITED

The following references are of record in the file of this patent:

UNITED STATES PATENTS

| Number | Name | Date |
|---|---|---|
| 1,461,956 | Wood | July 17, 1923 |
| 1,985,265 | Smith | Dec. 25, 1934 |
| 2,026,368 | Warren | Dec. 31, 1935 |
| 2,116,508 | Colvin | May 10, 1938 |

FOREIGN PATENTS

| Number | Country | Date |
|---|---|---|
| 720,070 | France | Nov. 24, 1931 |
| 790,914 | France | Sept. 16, 1935 |